Sept. 27, 1932. B. LONG 1,879,699
TEMPERING GLASS
Filed Oct. 6, 1931
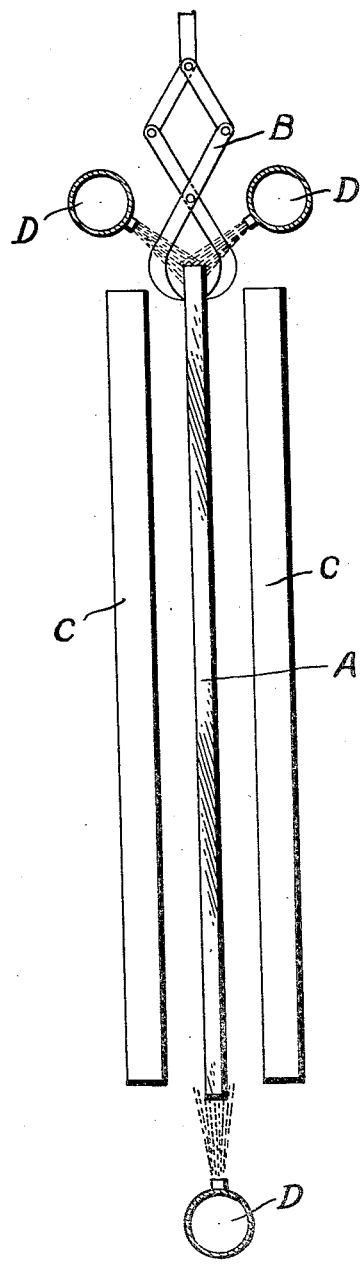
Inventor
Bernard Long,
By
Attorney Patented Sept. 27, 1932

1,879,699

UNITED STATES PATENT OFFICE

BERNARD LONG, OF PARIS, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE

TEMPERING GLASS

Application filed October 6, 1931, Serial No. 567,287, and in France October 23, 1930.

It has been proposed to temper glass sheets by rapidly chilling them between cooling elements, such elements comprising either heat-absorbing surfaces, or air jets directed on the opposite flat faces of the heated sheets, the sheets at the time of chilling being uniformly heated to a temperature of 550° to 620° C. in the case of glass of the composition of ordinary window glass. Such treatment results in a strengthening of the sheet, due to the fact that the outer layers thereof are hardened and resist penetration of, or scratching by, a body striking it on one of its flat faces. It has been found, however, that sheets tempered in the manner above described are less resistant to blows delivered on the edges thereof. A careful study of such sheets has revealed that this is due to the fact that the tempered layer, i. e. the layer in which the molecules are under compression, is extremely thin along the edges of the sheet. This invention has for its object to increase the resistance of the sheets to blows delivered at or near the edges thereof by providing special means to rapidly and effectually cool the sheet along its edges to increase the thickness of the tempered layer at such points, and for this purpose it consists of the features hereinafter described and claimed.

Referring to the accompanying drawing which is a vertical section of a device embodying my invention, A is a sheet of heated glass suspended by the tongs B, between two cooling elements C, adapted to chill the surface thereof. The cooling elements may be air chests adapted to direct jets of air on the flat faces of the sheets (as shown in the application of Long and Touvay, Sr. No. 434,263) or may consist of a box, the surface of which is chilled by a refrigerant circulated through the box, (as is disclosed in the application of Henry Lebel, Sr. No. 469,745). In addition to the chilling elements C, I provide nozzles D adapted to direct air jets on the edges of the plate whereby the thickness of the tempered layer at and adjacent to such edges is increased with a corresponding increase in the resistance of the sheet to blows delivered on the edges thereof.

Having thus described my invention what I claim and desire to secure by Letters Patent is:

1. In an apparatus for tempering glass sheets, the combination with cooling elements spaced from each other a sufficient distance to permit the insertion of a heated glass sheet between them and forming a tempered skin on the sides thereof, of nozzles projecting air jets directly on the edges of such sheet to thicken the tempered skin at such edges.

2. In an apparatus for tempering glass sheets, the combination with cooling elements spaced from each other a sufficient distance to permit the insertion between them of a heated glass sheet and forming a tempered skin on the sides thereof, of nozzles projecting air jets directly on the edges of such sheet to thicken the tempered skin at such edges.

In testimony whereof I hereunto affix my signature.

BERNARD LONG.